HIGH SPEED MAGNETIC AMPLIFIER

Filed Sept. 30, 1954

INVENTOR.
HERBERT W. KUNNES
BY
Herbert Smith
ATTORNEY 2,820,156
Patented Jan. 14, 1958

2,820,156

HIGH SPEED MAGNETIC AMPLIFIER

Herbert W. Kunnes, Hackensack, N. J., assignor to Bendix Aviation Corporation, Teterboro, N. J., a corporation of Delaware Application September 30, 1954, Serial No. 459,285

8 Claims. (Cl. 307—106)

This invention relates to magnetic amplifiers and more particularly to high-speed magnetic amplifiers usable with low impedance signal systems.

It is an object of the invention to provide a novel high-speed magnetic amplifier.

A further object of the invention is to provide a novel phase sensitive magnetic amplifier.

A further object of the invention is to provide a novel magnetic amplifier having a maximum signal output comprising half wave pulses.

Another object of the invention is the provision of a novel magnetic amplifier usable with a low impedance signal source, such as with an inductive device of the synchro type.

Another object of the invention is to provide a novel magnetic amplifier which has a maximum delay of one cycle of the carrier frequency, which frequency is the same as the excitation frequency.

Another object is to provide a novel magnetic amplifier which will have a minimum of parts, be efficient in operation, and low in cost of manufacturing.

The present invention contemplates a high-speed magnetic amplifier having an alternating current input and a pulsating direct current output, and wherein a pair of elements are employed, each element having a power winding, a reset winding, and a signal or control winding. The device may be used with a synchro as the signal source, being of low level and of the order of about 300 millivolts.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

Figure 1:
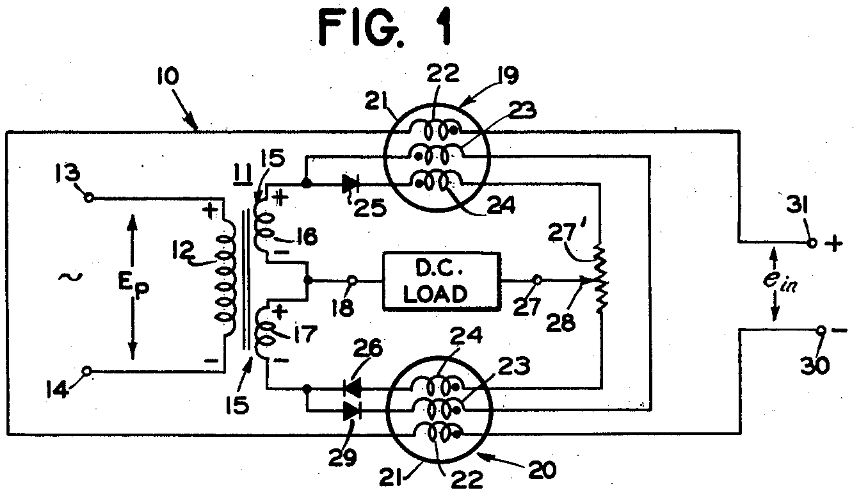
Fig. 1 is a schematic diagram of a novel high-speed magnetic amplifier constructed according to the invention.

Referring to the drawing and more particularly to Fig. 1, there is shown a high-speed magnetic amplifier 10 having a power transformer 11 with a primary winding 12 connected to excitation terminals 13 and 14, with the symbol $E_p$ representing excitation voltage for the power winding across terminals 13 and 14.

A secondary winding 15 of the power transformer includes two portions 16 and 17 having a common or midpoint connected to a terminal 18, which is one terminal of the output connectable to the load.

A pair of magnetic amplifier elements 19 and 20 each have a core 21, preferably in the form of a toroid, with a signal winding 22, a reset winding 23, and a power winding 24 wound thereon.

A pair of rectifiers 25 and 26 are serially connected with the secondary winding 15 and the power windings 24 of these magnetic amplifier elements 19 and 20. The power windings are connected in series aiding relationship as shown by the dot symbol, which is conventional for indicating the start of the windings. The power windings 24 are connected to a balancing resistor 27′ having a variable mid-tap 28 connected to the other output terminal 27. The purpose of the balancing resistor is to balance the bridge arrangement of the windings in the power winding circuit. The rectifiers 25 and 26 are connected with their polarities aiding.

The reset windings 23 of magnetic amplifier elements 19 and 20 are connected in series aiding, as indicated by the dot symbol, across the terminals of the secondary winding 15 of the power transformer. A single rectifier 29 is connected in the reset winding circuit to pass current in one direction only.

The signal windings 22 of the magnetic amplifier elements 19 and 20 are connected in series opposition across the signal input terminals 30 and 31 which, in the drawings, are shown by the symbol $e_{in}$.

The polarities shown on the schematic diagram of Fig. 1 are indicated by the conventional symbols (+) and (−) for a given instance.

Figure 3:
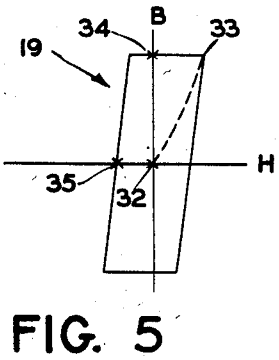
Figs. 3 and 4 are B–H curves for a "no signal" condition of the two magnetic amplifier elements employed in the invention.
Figure 4:
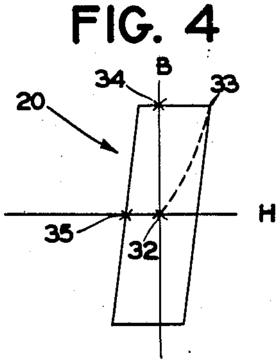

Figs. 3 and 4 are the B–H curves when the power transformer is supplying excitation voltage and there is a "no signal" condition. The impedance of the power windings is the same in both magnetic core elements at every instant, that is, the elements are cycling together. This condition maintains the bridge circuit of the power windings at a balanced condition, since the balancing resistor is properly adjusted. However, the balancing resistor would not be necessary if the magnetic amplifier elements were identical. However, since this is not usually the case, the balancing resistor in the form of a potentiometer, is ordinarily necessary for fine adjustment of the null; that is when there is no load current.

The magnetization of cores 21 of magnetic amplifiers 19 and 20 for a no signal condition is shown in Figures 3 and 4, respectively. The magnetization of each core 21 during the power cycle follows the B–H curve from point 32 at the origin to point 33 at full saturation and then to point 34 at the end of the power cycle. On the next half cycle or reset cycle, magnetization of each core 21 follows the B–H curve from point 34 to point 35 and returns to point 32 at the end of the reset cycle.

The input signal must be in phase or 180° out of phase with the power transformer excitation.

Figure 5:
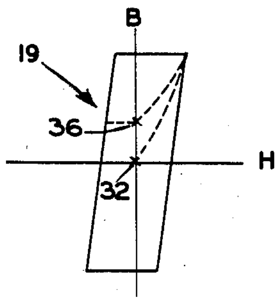
Figs. 5 and 6 are B–H curves of the two magnetic amplifier elements under the condition when a signal is introduced.
Figure 6:
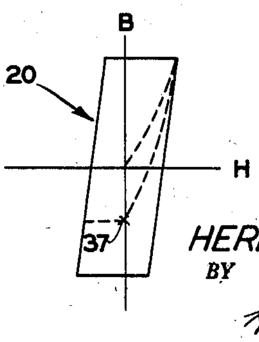

Upon introduction of a signal $e_{in}$ across terminals 13, 14 of the same phase as the excitation voltage $E_p$ across input terminals 30 and 31, the signal aids or adds to the flux created by the reset winding of magnetic amplifier core element 20. The signal will oppose flux created by the reset winding in magnetic amplifier element 19. Under this condition, the B–H curves will be as shown in Figs. 5 and 6 for the cores of elements 19 and 20, respectively. The condition set forth immediately above is for the first half cycle of the signal when the instantaneous signal and power winding polarity are as shown by symbol in Fig. 1. At the end of the first half cycle core 21 of magnetic amplifier 19 is magnetized to point 36 on the B–H curve as shown in Fig. 5, and core 21 of magnetic amplifier 20 is magnetized to point 37 on the B–H curve as shown in Fig. 6.

Core element 19 will be saturated before core element 20. During the interval when core element 19 is saturated and core element 20 is unsaturated, the bridge circuit is unbalanced and current will flow through the load.

When core element 19 is saturated, a pulse of current flows through the load in a direction from terminal 18 to terminal 27. If a signal of opposite phase is impressed upon the input terminals, the pulse of current through the load will be of opposite polarity so that the circuit is phase sensitive.

Figure 2:
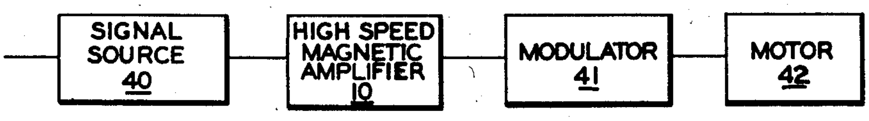
Fig. 2 is a block diagram showing the manner in which the invention may be used.

The block diagrams in Fig. 2 show a signal source 40 which may be any suitable low impedance signal source, such as a synchro, having its output connected to the input of the novel high speed magnetic amplifier 10. The output of the high speed magnetic amplifier is shown connected to a modulator 41, which in turn has its output connected to a motor 42. With the arrangement shown in Fig. 2, the present invention may be used to amplify the output of a synchro which may be used to drive a motor usable for any desirable purpose, having particular application in a servo system.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a high speed magnetic amplifier having toroidal cores each with power, reset, and control windings thereon, a reset circuit formed by said reset windings connected in series aiding relationship, a signal circuit formed by said control windings connected in series opposition and providing signal input terminals, rectifiers connected with said power windings and with their polarities and windings respectively aiding and forming a power circuit, a source of alternating current excitation connected to said power and reset circuits, and load terminals formed at an electrical mid-point of said source of excitation and an electrical mid-point of said power circuit, to the end that when a load is connected to said load terminals a pulsating direct current will flow through said load upon energization of said signal circuit by connecting a modulated alternating current signal to said input terminals.

2. In a high speed magnetic amplifier having toroidal cores each with power, reset, and control windings thereon, a reset circuit formed by said reset windings connected in series aiding, a signal circuit formed by said control windings connected in series opposition and providing signal input terminals, rectifiers connected with said power windings and with their polarities and windings respectively aiding and forming a power circuit, a source of alternating current excitation connected to said power and reset circuits, load terminals formed at an electrical mid-point of said source of excitation and an electrical mid-point of said power circuit, and a load connected to said output terminals, whereby a pulsating direct current will flow through said load upon energization of said signal circuit by connecting an alternating current signal to said input terminals.

3. A high speed magnetic amplifier comprising a pair of elements, each of said elements having a core with a power winding, a reset winding, and a control winding thereon, said power windings being connected in series aiding relationship, said reset windings being connected in series aiding relationship, and said control windings being connected in series opposition, a rectifier serially connected with each of said power windings with the polarities of said rectifiers aiding and forming a power circuit having a mid-point, said reset windings being connected in parallel with said power circuit, a source of excitation connected to the parallel circuit, a signal source connected to said control windings, and output terminals at an electrical mid-point of said source of excitation and an electrical mid-point of said power circuit, to the end that when a load is connected to said output terminals a pulsating direct current will flow therethrough upon energization of said signal circuit by a suitable alternating current signal.

4. A high speed magnetic amplifier comprising a pair of elements, each of said elements having a core with a power winding, a reset winding, and a control winding thereon, said power windings being connected in series aiding relationship, said reset windings being connected in series aiding relationship, and said control windings being connected in series opposition, a rectifier serially connected with each of said power windings with the polarities of said rectifiers aiding and forming a power circuit having a mid-point, said reset windings being connected in parallel with said power circuit, a source of excitation connected to the parallel circuit, a signal source connected to said control windings, resistive means connected substantially at an electrical mid-point of said power circuit and having a variable point as one output terminal, and a second output terminal at a mid-point of said source of excitation, whereby, upon energization of said control windings by a suitable source of alternating current, a load connected to both of said output terminals will be excited by a pulsating direct current.

5. A high speed magnetic amplifier having a source of excitation with a common mid-point, a pair of elements each having a power winding, a reset winding, and a signal winding, a rectifier serially connected with each power winding, said power windings and rectifiers being connected in series aiding relationship and forming a power circuit and having a common mid-point, said reset windings being connected in series aiding relationship and forming a reset circuit, said signal windings being connected in series opposition and forming a signal circuit, said power circuit and said reset circuit being connected in parallel across said source of excitation, said common points of said source of excitation and said power circuit providing output terminals, whereby a pulsating direct current will be derived at said output terminals from an alternating current signal applied to said signal circuit.

6. A high speed magnetic amplifier having a source of excitation with a common point, a pair of elements each having a power winding, a reset winding, and a signal winding, a rectifier serially connected with each power winding, said power windings and rectifiers being connected in series aiding relationship and forming a power circuit and having a common mid-point, said reset windings being connected in series aiding relationship and forming a reset circuit, said signal windings being connected in series opposition and forming a signal circuit, said power circuit and said reset circuit being connected in parallel with said source of excitation, said common points of said source of excitation and said power circuit forming output terminals, and a signal source of modulated alternating current connected to said signal circuit to provide a pulsating direct current to a load connected to said output terminals.

7. A high speed magnetic amplifier comprising a pair of elements each having a core with a power winding, a reset winding, and a control winding thereon, said power windings being connected in series aiding relationship, said reset windings being connected in series aiding relationship, and said control windings being connected in series opposition; a rectifier serially connected with each of said power windings with the polarities of said rectifiers aiding, said reset windings being connected in parallel with said power windings and rectifiers, a source of excitation connected across said parallel connected reset windings and said power windings and rectifiers, an alternating current signal source connected to said control windings, and output terminals at a mid-point of said source of excitation and a mid-point of the power winding and rectifier circuit for connection to a load circuit for providing a pulsating direct current thereat of a polarity depending on the phase of said alternating current signal source.

8. A high speed magnetic amplifier comprising a pair of elements each having a core with a power winding, a reset winding, and a control winding thereon, said power windings and said reset windings being connected in series aiding relationship respectively, said control windings being connected in series opposition, a rectifier serially connected with each of said power windings with the polarities of said rectifiers aiding, said reset windings being connected in parallel with said power windings and rectifiers, a source of excitation connected across said parallel connected reset and power winding circuits, an alternating current signal source connected to said control windings, and output terminals connected to a mid-point of said source of excitation and a mid-point of said power winding circuit, and a load circuit connected to said output terminals to be energized by a pulsating direct current output.

References Cited in the file of this patent

UNITED STATES PATENTS 2,704,823 Storm ---------------- Mar. 22, 1955